(12) United States Patent
Li (10) Patent No.: US 12,542,324 B2
(45) Date of Patent: Feb. 3, 2026

(54) BATTERY REPLACEMENT DEVICE FOR VEHICLES, DUAL-FLOATING HOISTING BATTERY REPLACEMENT STATION, AND BATTERY REPLACEMENT SYSTEM

(71) Applicants: ZHEJIANG GEELY HOLDING GROUP CO., LTD., Hangzhou (CN); ZHEJIANG GEELY FARIZON NEW ENERGY COMMERCIAL VEHICLE GROUP CO., LTD., Hangzhou (CN)

(72) Inventor: Shufu Li, Hangzhou (CN)

(73) Assignees: ZHEJIANG GEELY HOLDING GROUP CO., LTD., Hangzhou (CN); ZHEJIANG GEELY FARIZON NEW ENERGY COMMERCIAL VEHICLE GROUP CO., LTD., Hangzhou (CN)

( * ) Notice: Subject to any disclaimer, the term of this patent is extended or adjusted under 35 U.S.C. 154(b) by 275 days.

(21) Appl. No.: 18/315,824

(22) Filed: May 11, 2023

(65) Prior Publication Data
US 2023/0291052 A1 Sep. 14, 2023

Related U.S. Application Data

(63) Continuation of application No. PCT/CN2020/139412, filed on Dec. 25, 2020.

(30) Foreign Application Priority Data

Nov. 20, 2020 (CN) .......................... 202011315344.3

(51) Int. Cl.
*B60L 53/80* (2019.01)
*B60K 1/04* (2019.01)
(Continued)

(52) U.S. Cl.
CPC ........... *H01M 50/249* (2021.01); *B60R 16/04* (2013.01); *H01M 50/244* (2021.01);
(Continued)

(58) Field of Classification Search
CPC ............. H01M 50/249; H01M 50/244; H01M 50/262; H01M 2220/20; B60R 16/04;
(Continued)

(56) References Cited

FOREIGN PATENT DOCUMENTS

| CN | 202320236 U | * | 7/2012 | ................ B60S 5/06 |
| CN | 206231369 U |   | 6/2017 | |

(Continued)

OTHER PUBLICATIONS

Machine translation for IDS cited CN 210212016 U, pp. 1-6. (Year: 2025).*

(Continued)

*Primary Examiner* — Tisha D Lewis
(74) *Attorney, Agent, or Firm* — Westbridge IP LLC (57) ABSTRACT

A battery replacement device for vehicles includes a battery module, a first floating structure and a fixing device, the fixing device is used to fix the battery module on the longitudinal beam of the vehicle, the fixing device includes a fixing substrate, the first floating structure is provided between the battery module and the fixing substrate, and the first floating structure is used to alleviate a vibration amplitude of the battery module.

14 Claims, 8 Drawing Sheets

(51) Int. Cl.
*B60R 16/04* (2006.01)
*H01M 50/244* (2021.01)
*H01M 50/249* (2021.01)
*H01M 50/262* (2021.01)
*H02J 7/00* (2006.01)

(52) U.S. Cl.
CPC ...... *H01M 50/262* (2021.01); *H01M 2220/20* (2013.01); *H02J 7/0045* (2013.01)

(58) Field of Classification Search
CPC .......... H02J 7/0045; B60K 2001/0416; B60K 2001/0466; B60K 2001/0494; B60K 1/04; B60K 2001/0455; B60L 53/80; B60L 50/66
See application file for complete search history.

(56) References Cited

FOREIGN PATENT DOCUMENTS

| | | | | |
|---|---|---|---|---|
| CN | 107719331 | A | 2/2018 | |
| CN | 107959144 | A | 4/2018 | |
| CN | 109109832 | A * | 1/2019 | ............... B60S 5/06 |
| CN | 109649214 | A | 4/2019 | |
| CN | 209008372 | U * | 6/2019 | ............... B60K 1/04 |
| CN | 209351372 | U | 9/2019 | |
| CN | 110329219 | A | 10/2019 | |
| CN | 108674165 | B * | 11/2019 | ............... B60K 1/04 |
| CN | 110406504 | A | 11/2019 | |
| CN | 110901364 | A | 3/2020 | |
| CN | 210212016 | U | 3/2020 | |
| CN | 111114376 | A * | 5/2020 | ............... B60L 53/80 |
| CN | 111137372 | A | 5/2020 | |
| CN | 210634414 | U | 5/2020 | |
| CN | 211764962 | U | 10/2020 | |
| CN | 111907367 | A | 11/2020 | |
| CN | 111923714 | A | 11/2020 | |
| EP | 3705358 | A1 | 9/2020 | |
| EP | 3705362 | A1 | 9/2020 | |
| GB | 2443272 | A | 4/2008 | |
| GB | 2443272 | B | 1/2011 | |
| JP | S4829509 | U | 4/1973 | |
| JP | S4957330 | A | 6/1974 | |
| JP | 2011168127 | A | 9/2011 | |
| JP | 2012529408 | A | 11/2012 | |
| JP | 2015500928 | A | 1/2015 | |
| JP | 2019087349 | A | 6/2019 | |

OTHER PUBLICATIONS

Machine translation for IDS cited CN 107719331 A, pp. 1-10. (Year: 2025).*
Machine translation for IDS cited CN 110406504 A, pp. 1-10. (Year: 2025).*
Extended European Search Report issued in counterpart European Patent Application No. 20962305.7, dated Dec. 18, 2024.
Notification to Grant Patent Right for Invention issued in counterpart Russian Patent Application No. 2023115095/11, dated Jan. 9, 2024.
Notice of Reasons for Refusal issued in counterpart Japanese Patent Application No. 2023-550342, dated Jun. 4, 2024.
First Office Action issued in counterpart Chinese Patent Application No. 202011315344.3, dated Apr. 28, 2022.
Grant Notification issued in counterpart Chinese Patent Application No. 202011315344.3, dated Mar. 30, 3023.
International Search Report and Written Opinion issued in corresponding PCT Application No. PCT/CN2020/139412, dated Aug. 18, 2021.
Second Office Action issued in counterpart Chinese Patent Application No. 202011315344.3, dated Nov. 10, 2022.
First Office Action issued in counterpart Korean Patent Application No. 10-2023-7018307, dated Jul. 4, 2025.

* cited by examiner

BATTERY REPLACEMENT DEVICE FOR VEHICLES, DUAL-FLOATING HOISTING BATTERY REPLACEMENT STATION, AND BATTERY REPLACEMENT SYSTEM

CROSS-REFERENCE TO RELATED APPLICATIONS

This application is a continuation application of International Application No. PCT/CN2020/139412, filed on Dec. 25, 2020, which claims priority to Chinese Patent Application No. 202011315344.3, filed on Nov. 20, 2020. The disclosures of the above-mentioned applications are incorporated herein by reference in their entireties.

TECHNICAL FIELD

The present application relates to the technical field of battery replacement, in particular to a battery replacement device for vehicles, a dual-floating hoisting battery replacement station, and a battery replacement system.

BACKGROUND

In recent years, new energy vehicles have developed rapidly. Electric vehicles driven by batteries have advantages of zero emissions and low noise. However, the electric vehicles have two big historical problems, i.e., the range anxiety and the long charging period, have kept them from gaining popularity in profit-oriented commercial vehicles. With the disclosure and development of passenger car battery replacement technology, the battery replacement technology is gradually averted to the field of commercial vehicles.

In the present battery replacement technology of commercial vehicles, there exists following problems: the battery box is only confined by positioning pins along three directions of X, Y, and Z at the bottom, but there is no locking mechanism, and due to the high power consumption of commercial vehicles, the total power of the battery system is high, which leads to a high gravity center of the battery system. Where there is an impact condition, especially the high-speed emergency braking condition, the bottom structure is easily to damage the system and cause a collapse. The vibration amplitude is too large during the bumping process, and the bottom of the battery pack is a rigid structure, which is easy to cause damage to the battery. Secondly, due to uneven cargo quality, deformation of the vehicle, and uneven tire pressure during the battery replacement in the existing battery replacement system, it is difficult to locate the grabbing device in the battery replacement station, and it is easy to swing when replacing the battery, which causes safety risks.

SUMMARY

The main objective of the present application is to solve the technical problem that the battery box is easily subject to bumps when the vehicle is running and is easily damaged by an impact during the battery replacement.

In order to solve the above technical problems, the present application provides a battery replacement device for vehicles, including a first battery module, a first floating structure and a fixing device;
the fixing device can fix the first battery module on a longitudinal beam of a vehicle;
the fixing device includes a fixing substrate can carry the first battery module; and
the first floating structure is provided between the first battery module and the fixing substrate, and can alleviate a vibration amplitude of the first battery module.

In an embodiment, the first floating structure includes a first floating portion, a buffer limiting portion and a battery floating platform;
a bottom surface of the battery floating platform is connected to the fixing substrate through the first floating portion, and a top surface of the battery floating platform is connected to the first battery module through the buffer limiting portion.

In an embodiment, the battery floating platform is provided with a first positioning portion and a second positioning portion;
the fixing substrate is provided with a third positioning portion;
a bottom of the first battery module is provided with a fourth positioning portion and a fifth positioning portion; and
the fifth positioning portion and the first positioning portion are connected to the third positioning portion, and the second positioning portion is matched with the fourth positioning portion.

In an embodiment, the first positioning portion and the fifth positioning portion are both first positioning pin holes, and the third positioning portion is a first positioning pin matching the first positioning pin hole; and
the second positioning portion is a second positioning pin, and the fourth positioning portion is a second positioning pin matching the second positioning pin hole.

In an embodiment, the device further includes a connector;
the first floating structure further includes a connector floating platform and a second floating portion;
the connector is fixed on the connector floating platform; and
the connector floating platform is fixed on the battery floating platform through the second floating portion.

In an embodiment, the first floating portion includes a plurality of floating members;
the buffer limiting portion includes a plurality of buffer members; and
the second floating portion includes a plurality of floating members.

In an embodiment, the floating member includes an elastic member.

In an embodiment, the device further includes a buffer portion provided on the fixing substrate.

In an embodiment, the fixing device further includes a first side bracket and a second side bracket opposite to each other;
the first side bracket and the second side bracket are connected to the fixing substrate, and the first side bracket is opposite to the second side bracket along a direction of a longitudinal beam.

In an embodiment, the device further includes a first support structure and a second support structure, one end of the first support structure and one end of the second support structure are connected to the longitudinal beam, and another end of the first support structure is connected to the first side bracket and another end of the second support structure is connected to the second side bracket.

In an embodiment, the device further includes a top frame, the top frame is provided on a top of the first battery module, and is locked to the first side bracket and the second side bracket; and the top frame is provided with a positioning structure and a locking structure, the positioning structure and the locking structure are can cooperate with a battery replacement device of a battery replacement station to grab or release.

In an embodiment, a cross section of the first battery module is an inverted concave shape structure, the first battery module is mounted on the longitudinal beam in a saddle shape, and a concave part of the first battery module is fixed on a top of the longitudinal beam; or the first battery module is a cuboid structure, and a bottom of the first battery module is fixed to the top of the longitudinal beam.

In an embodiment, the device further includes a second battery module fixed to a bottom or a side wall of the longitudinal beam at any side of the vehicle.

In an embodiment, the second battery module includes a first battery sub-box, a second battery sub-box and a battery frame, the first battery sub-box is connected to the second battery sub-box through the battery frame, the battery frame is fixed at the bottom of the longitudinal beam, and the battery frame is provided with a quick-change connector or an electrical connector.

In an embodiment, the device further includes a second battery module, the second battery module includes a first battery sub-box, a second battery sub-box and a battery frame, the first battery sub-box and the second battery sub-box are respectively fixed below two ends of the first battery module, the battery frame is fixed at the bottom of the longitudinal beam, and the battery frame is provided with a quick-change connector or an electrical connector.

The present disclosure further provides a dual-floating hoisting battery replacement station, including a battery grabbing structure, the battery grabbing structure includes a grabbing plate and a second floating structure;

the second floating structure is fixed on a grabbing side of the grabbing plate; and the grabbing plate is cooperated with the first battery module of the vehicle through the second floating structure to grab or release the first battery module, and the second floating structure can alleviate a swing amplitude of the battery grabbing structure when grabbing the battery module.

In an embodiment, the second floating structure includes a second floating platform and a third floating portion; and the second floating platform is connected to the grabbing plate through the third floating portion.

In an embodiment, the battery grabbing structure further includes a grabbing portion, the grabbing portion is passed through the second floating platform, and the grabbing portion can cooperate with the first battery module to grab or release.

In an embodiment, the third floating portion is sleeved outside the grabbing portion.

In an embodiment, the station further includes a grabber rotating motor, and the grabber rotating motor is electrically connected to the grabbing portion.

In an embodiment, the second floating platform is provided with a first locking portion, and the first locking portion can be matched with the first battery module to lock or unlock.

In an embodiment, the second floating platform is provided with a locking drive motor; and the locking drive motor is electrically connected to the first locking portion.

In an embodiment, the floating platform is provided with a sixth positioning portion; and the sixth positioning portion is cooperated with the first battery module to position.

In an embodiment, the station further includes a pressure sensor, and the pressure sensor is provided on the grabbing portion.

The present disclosure further provides a vehicle hoisting battery replacement system, including the battery replacement device for vehicles and the dual-floating hoisting battery replacement station.

The first floating structure provided between the first battery module and the fixing substrate floatingly connects the first battery module to the vehicle, which can effectively alleviate the vibration amplitude of the first battery module during the driving of the vehicle and the impact on the battery during the battery replacement.

BRIEF DESCRIPTION OF THE DRAWINGS

In order to illustrate the technical solutions in the embodiments of the present application or in the related art more clearly, the following briefly introduces the accompanying drawings required for the description of the embodiments or the prior art. Obviously, the drawings in the following description are only part of embodiments of the present application. For those of ordinary skill in the art, other drawings can also be obtained according to the structures shown in these drawings without any creative effort.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by those skilled in the art based on the embodiments of the present application without creative efforts shall fall within the scope of the present application.

The "one embodiment" or "an embodiment" herein refers to a specific feature, structure or characteristic that may be included in at least one implementation of the present application. In the description of the embodiments of the present application, it should be understood that the orientations or positional relationships indicated by the terms "up", "down", "top", and "bottom" are based on the orientations or positional relationships shown in the drawings, and are only for the convenience of describing the present application and simplifying the description, rather than indicating or implying that the device or element must have a specific orientation, be constructed and operated in a specific orientation, and thus should not be construed as a limit to the present application. In addition, the terms "first" and "second" are used for descriptive purposes only, and cannot be interpreted as indicating or implying relative importance or implicitly specifying the quantity of indicated technical features. Therefore, the features defined as "first" and "second" may explicitly or implicitly include one or more of these features. Also, the terms "first", "second", etc. are used to distinguish similar items and not necessarily to describe a specific order or sequence. It should be understood that the data are interchangeable under appropriate circumstances such that the embodiments of the application described herein can be practiced in sequences other than those illustrated or described herein.

Figure 1:
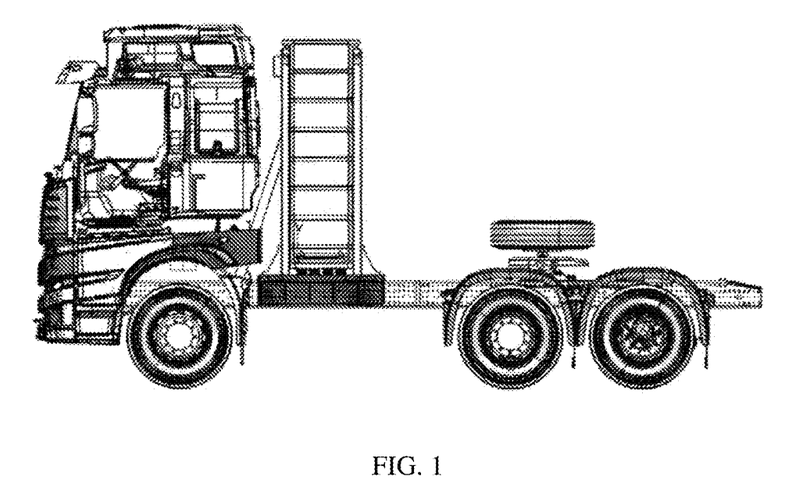
FIG. 1 is a schematic view of a location distribution of a battery replacement device for vehicles according to an embodiment of the present application.
Figure 2:
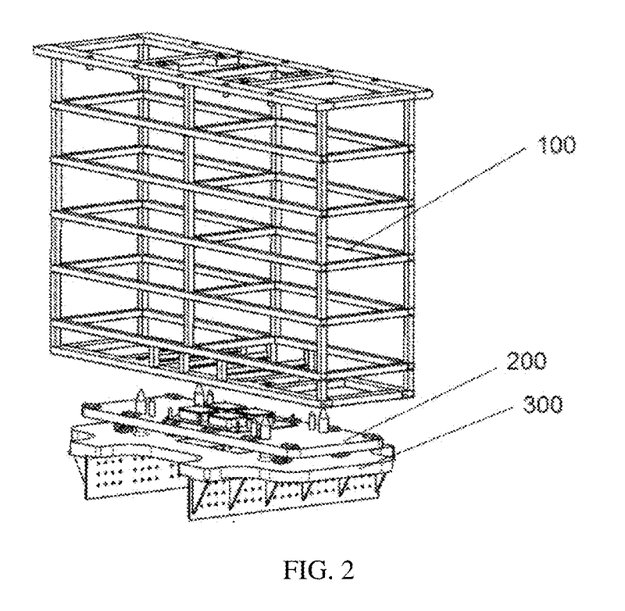
FIG. 2 is a schematic structural view of a battery replacement device for vehicles according to an embodiment of the present application.

FIG. 1 is a schematic view of a location of a battery replacement device distributed on vehicle according to an embodiment of the present application. FIG. 2 is a schematic structural view of a battery replacement device for vehicles according to an embodiment of the present application. as shown in FIG. 2, the battery replacement device for vehicles includes a first battery module 100, a first floating structure 200 and a fixing device. In an embodiment, the first battery module 100 includes a plurality of batteries to form a battery pack and a battery pack external frame, the fixing device is used to fix the first battery module 100 on a longitudinal beam of the vehicle, and the fixing device includes a fixing substrate 300.

The first floating structure 200 is provided between the first battery module 100 and the fixing substrate 300, the first floating structure 200 is used to alleviate a vibration amplitude of the first battery module 100.

The battery replacement device for vehicles provided by the present application is provided with the first floating structure 200 provided between the first battery module 100 and the fixing substrate 300, the first battery module 100 is floating and connected to vehicles by the floating structure, which can effectively alleviate the vibration amplitude of the first battery module 100 during running of the vehicle and alleviate an impact on the first battery module 100 during the battery replacement.

In an embodiment, a bottom of the fixing substrate 300 in the fixing device is connected to the longitudinal beam of the vehicle, and a top of the fixing substrate 300 in the fixing device is connected to the first floating structure 200.

Figure 3:
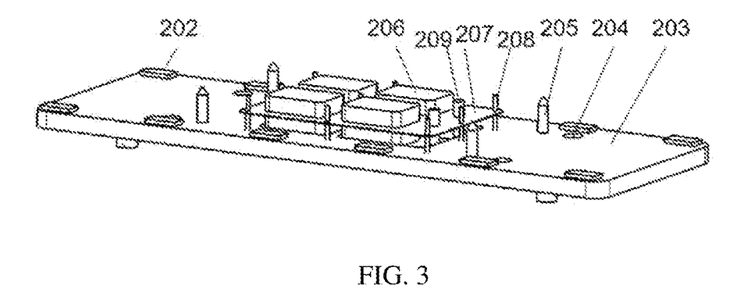
FIG. 3 is a schematic structural view of a first floating structure according to an embodiment of the present application.

In an embodiment, FIG. 3 is a schematic structural view of a first floating structure according to an embodiment of the present application. as shown in FIG. 3, the first floating structure 200 includes a floating platform structure, a first floating portion 201 and a buffer limiting portion 202, the floating platform structure includes a battery floating platform 203, a bottom of the battery floating platform 203 is connected to the fixing substrate 300 through the first floating portion 201, and a top of the battery floating platform 203 is connected to the first battery module 100 through the buffer limiting portion 202.

Figure 4A:
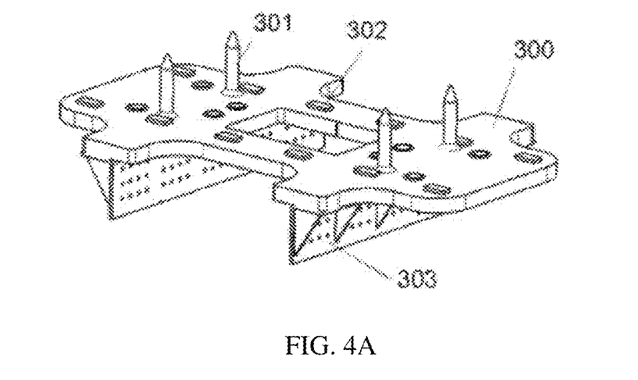
FIG. 4A is a schematic structural view of a fixing substrate according to an embodiment of the present application.

In an embodiment, the battery floating platform 203 is provided with a first positioning portion 204 and a second positioning portion 205. FIG. 4A is a schematic structural view of a fixing substrate according to an embodiment of the present application. The fixing substrate 300 is provided with a third positioning portion 301, a fourth positioning portion 101 and a fifth positioning portion 105 are provided at a bottom of the first battery module 100, the fifth positioning portion 105 and the first positioning portion 204 are matched with the third positioning portion 301, and the second positioning portion 205 is matched with the fourth positioning portion 101. FIG. 4A also includes a first floating portion installation portion for installing the first floating portion. In an embodiment, two fixing brackets 304 are provided below the fixing substrate 300, and the two fixing bracket 304 are respectively provided on both sides of the longitudinal beam of the vehicle.

In an embodiment, both the fifth positioning portion 105 and the first positioning portion 204 can be a first positioning pin hole, the third positioning portion 301 is a first positioning pin matching the first positioning pin hole, the second positioning portion 205 is a second positioning pin, and the fourth positioning portion 101 includes a second positioning pin matching the second positioning pin hole. The positioning pin on the fixing substrate 300 is used as a first level positioning for a guiding structure and a system of the battery floating platform 203.

In an embodiment, the battery replacement device for vehicles also includes a connector 206, and the connector 206 is connected to a lower connector of the first battery module 100, the floating platform structure also includes a connector floating platform 207 and a second floating portion 208, the connector 206 is fixed on the connector floating platform 207, and the connector floating platform 207 is fixed on the battery floating platform 203 through the second floating portion 208.

In an embodiment, the battery replacement device for vehicles also includes a coolant inlet and outlet 209, and the coolant inlet and outlet is provided on the connector floating platform 207.

In an embodiment, a lower part of the battery floating platform 203 is connected to the fixing substrate 300 through the first floating structure, which, as a first level floating of the system, can reduce the impact on the battery pack during the battery replacement and the vibration during driving. In an embodiment, the third positioning portion 301 on the fixing substrate 300 is cooperated with the first positioning portion 204 on the battery floating platform 203 to be as a guiding structure of the battery floating platform 203, and to confine a floating range of the battery floating platform 203 along an X or a Y direction thereof, thereby achieving a first level positioning of the system. The second positioning portion 205 on the battery floating platform 203 is cooperated with the fourth positioning portion 101 on the first battery module 100 to realize a second level positioning of the system, to further ensure an installation accuracy of the battery. The connector floating platform 207 is fixed on the battery floating platform 203 through the second floating portion 208, which alleviates the impact on the connector 206 during the battery replacement, and plays a second level floating protection role to the first battery module 100. The connector 206, the connector floating platform 207, and the coolant inlet and outlet can float together, which can be used as a third level floating of the system to alleviate the vibration of the vehicle and ensure a reliable connection of the connector 206, and the connector 206 is provided with a positioning pin to be as a third level positioning of the system, to realize an accurate connection of the system.

In an embodiment, a rubber bumper is provided on the battery floating platform 203 as a second level buffer structure of the system. In an embodiment, the battery replacement device for vehicles also includes a buffer portion 302, the buffer portion 302 is provided on the fixing substrate 300 as a first level buffer of the system. The battery floating platform 203 is provided with a second floating, and the buffer limiting portion 202 is a buffer member, which can realize a secondary buffer of the system and improve an overall stability and a redundancy of the system. In an embodiment, the battery replacement for the vehicle achieves a third level floating, a third level floating, and the second buffer by the cooperation of the fixing substrate 300 with the first floating structure 200. The third level positioning device realizes an accurate positioning when replacing the battery. The third level floating can alleviate the vibration amplitude of the first battery module 100 during driving, and improve stability and redundancy.

Figure 4B:
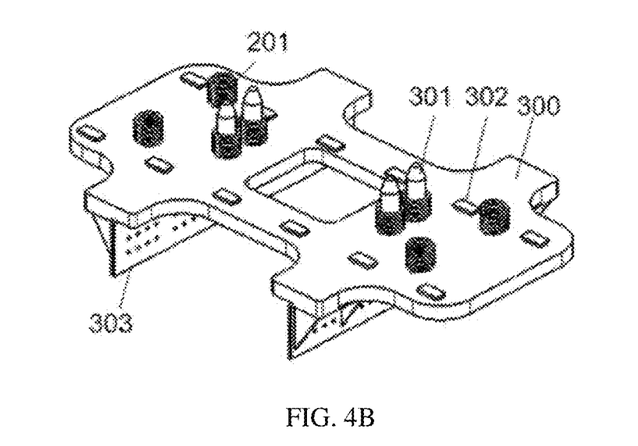
FIG. 4B is a schematic structural view of the fixing substrate according to an embodiment of the present application.

In an embodiment, the first floating portion 201 includes a plurality of the floating members, the buffer limiting portion 202 includes a plurality of the buffer members, and the second floating portion 208 includes a plurality of the floating members. In an embodiment, the floating member includes an elastic member and/or the buffer member. In an embodiment, both the first floating portion 201 and the second floating portion 208 can be the elastic member, and the elastic member can be a spring. The buffer limiting portion 202 is the buffer member, for example, a rubber bumper. In an embodiment, the spring of the first floating portion 201 can also be sleeved on the third positioning portion 301 as shown in FIG. 4B.

Figure 7:
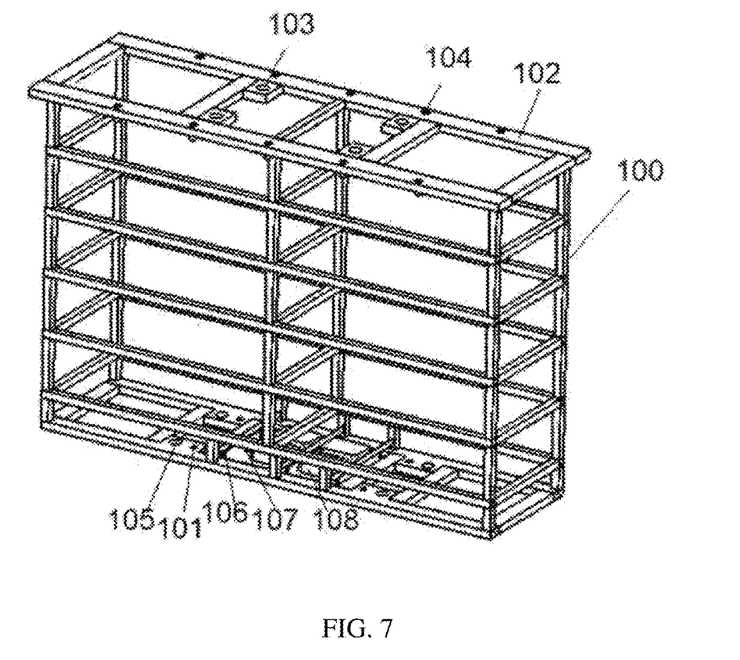
FIG. 7 is a schematic structural view of a battery module according to an embodiment of the present application.

In an embodiment, the first battery module 100 includes an external frame, and the fourth positioning portion 101 is provided at a bottom of the external frame. The bottom of the external frame is also provided with a positioning structure 103 cooperated with the third positioning portion 301, which can be the positioning pin hole.

In an embodiment, the bottom of the external frame is provided with a fixing structure of the connector 206 and the coolant inlet and outlet, the elastic member is provided on the fixing structure, and the elastic member can be the spring, which can realize a flexible connection of the connector 206, improve the system redundancy, reduce the vibration amplitude, and improve a coordination accuracy and efficiency of the system.

Figure 5:
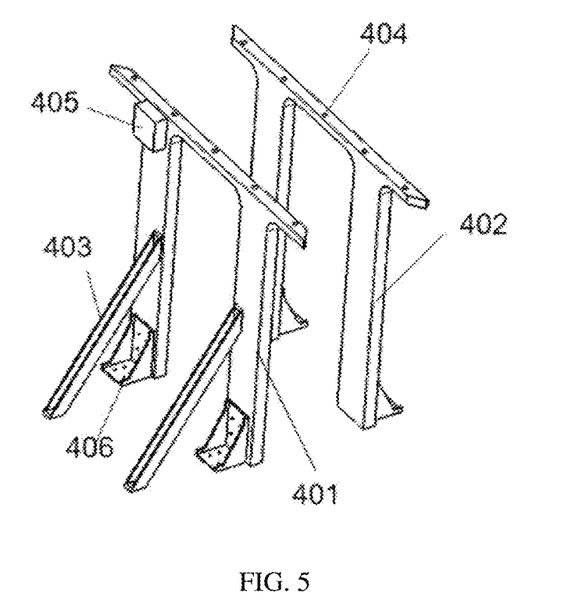
FIG. 5 is a schematic structural view of a first side bracket and a second side bracket according to an embodiment of the present application.
Figure 6:
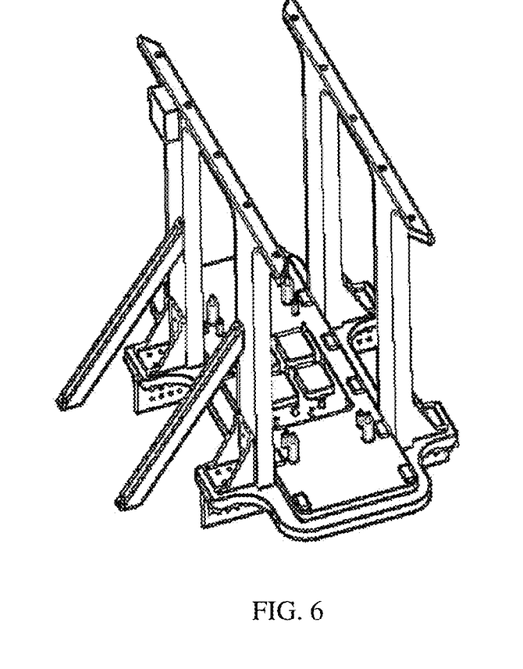
FIG. 6 is a schematic structural view of a fixing device according to an embodiment of the present application.

In an embodiment, as shown in FIG. 5, the fixing device also includes a first side bracket 401 and a second side bracket 402 opposite to each other. FIG. 6 is a schematic structural view of the fixing device. The first side bracket 401 and the second side bracket 402 are respectively connected to the fixing substrate 300, and the first side bracket 401 is opposite to the second side bracket 402 along the longitudinal beam direction.

In an embodiment, the battery replacement device for vehicles also includes a first support structure 403 and a second support structure, one end of the first support structure 403 and one end of the second support structure are respectively connected to the longitudinal beam, another end of the first support structure 403 is connected to the first side bracket 401 and another end of the second support structure is connected to the second side bracket 402. In an embodiment, each of tops of the first side bracket 401 and the second side bracket 402 is provided with a locking structure taper hole 404, and the fixing device also includes a battery system coolant tank 405 and an adapter bracket 406. In an embodiment, the fixing device has a function of lower limiting and upper locking, and the locking point is above the center of mass. The upper and lower ends of the first battery module can be fixed at the same time to limit and lock the first battery module, to improve a safety of a battery transportation.

In an embodiment, as shown in FIG. 7, the first battery module 100 includes a top frame 102. In an embodiment, the top frame 102 is provided with the positioning structure 103 and the locking structure 104, which are used to cooperate with the battery replacement device of the battery replacement station to grab or release. The positioning structure 103 is cooperated with the sixth positioning portion of the grabbing device mentioned below to realize grabbing and positioning, and the locking structure 104 is cooperated with the first locking portion of the grabbing device mentioned below to realize locking or unlocking. In an embodiment, the bottom of the first battery module 100 also includes a fifth positioning portion 105, the positioning hole is matched with the positioning pin on the fixing substrate. The bottom of the first battery module 100 also includes the fixing structure 106 for fixing the connector and the coolant inlet and outlet. The bottom of the first battery module 100 also includes a battery water inlet and outlet 107 and a battery high voltage connector 108. The fixing structure 106 is provided with the spring, which can realize the flexible connection of the connector.

In an embodiment, the positioning pin can provided on the top frame 102, the positioning hole can be provided at a corresponding position next to the locking structure taper hole 404, and a positioning can be provided to a locking surface between the top frame 102 and the first side bracket 401 and the second side bracket 402, to improve a locking accuracy.

In an embodiment, the battery replacement device for vehicles also includes a second battery module. There are various configuration schemes for the second battery module, some of which are described below with examples.

Figure 8:
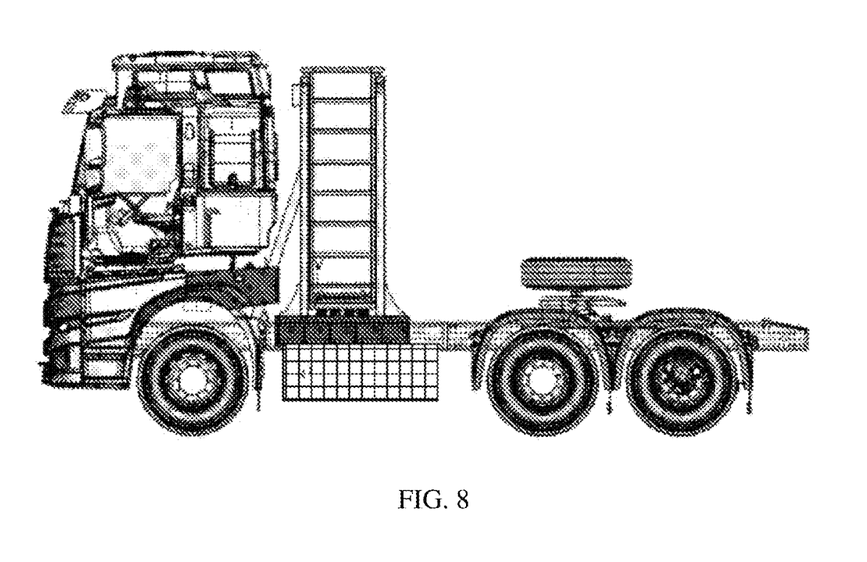
FIG. 8 is a schematic view of a location of a battery replacement device distributed on a vehicle according to an embodiment of the present application.
Figure 9:
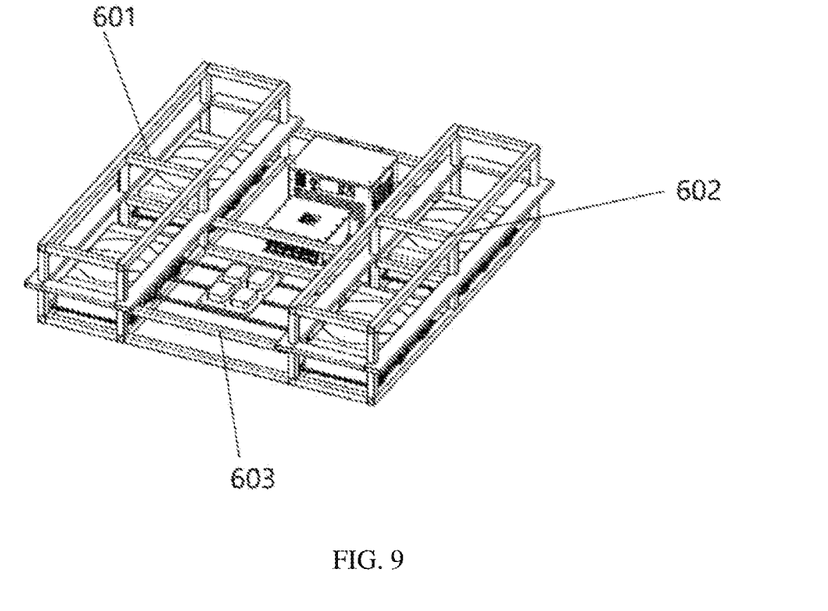
FIG. 9 is a schematic structural view of a second battery module according to an embodiment of the present application.
Figure 10:
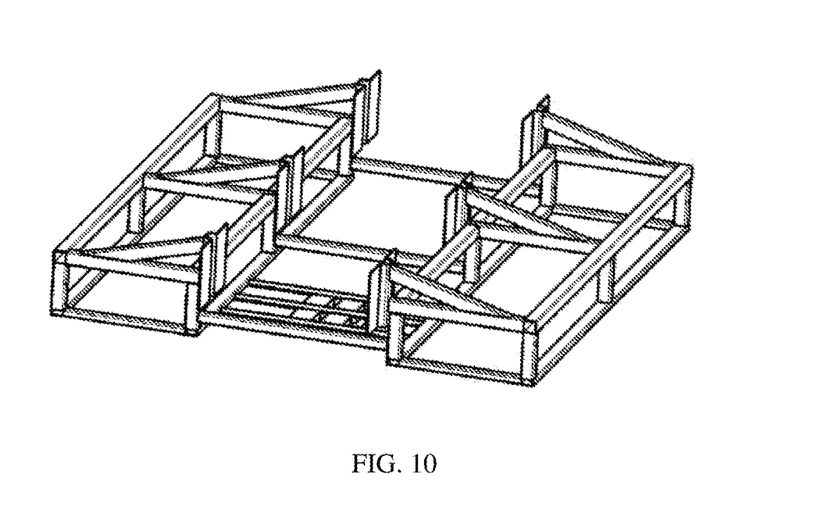
FIG. 10 is a schematic structural view of a fixing frame according to an embodiment of the present application.
Figure 11:
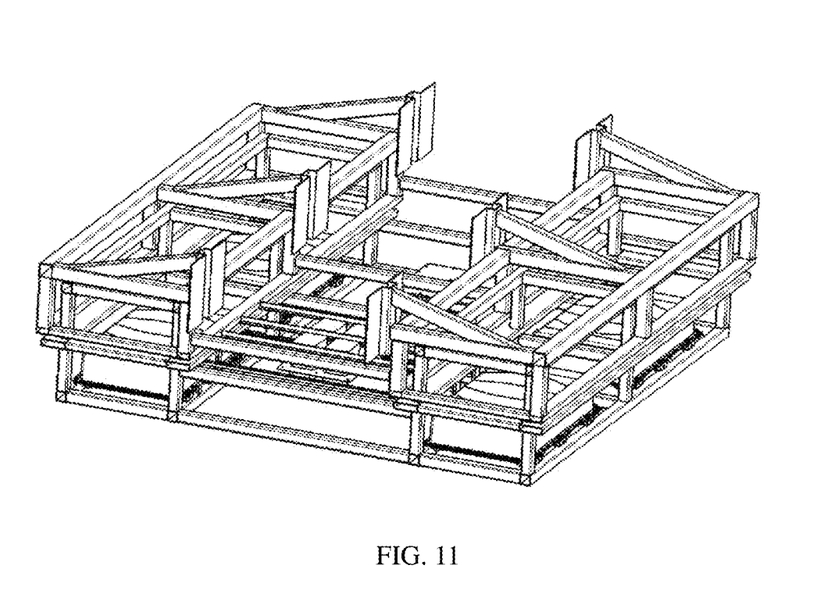
FIG. 11 is a schematic cooperative view of a fixing frame and the second battery module according to an embodiment of the present application.

In an embodiment, as shown in FIG. 8, the second battery module is fixed on the bottom or side wall of the longitudinal beam on any side of the vehicle. The second battery module can also be provided on the bottom or side wall of the longitudinal beam on both sides of the vehicle. as shown in FIG. 9, the second battery module can include a first battery sub-box 601, a second battery sub-box 602 and a battery frame 603. The first battery sub-box 601 is connected to the second battery sub-box 602 through the battery frame 603, and the battery frame 603 is fixed on the bottom of the longitudinal beam. In an embodiment, the battery frame 603 is fixed on the bottom or side wall of the longitudinal beam of the vehicle. In an embodiment, as shown in FIG. 10, one end of the fixing frame is connected to the battery frame 603, another end of the fixing frame is connected to the bottom or side wall of the longitudinal beam. FIG. 11 is a schematic cooperative view of a fixing frame and the second battery module according to an embodiment of the present application. In an embodiment, the battery frame is provided with a quick-change connector or an electrical connector.

In an embodiment, the second battery module is integrally provided on the bottom of the longitudinal beam, and is not provided on one side of the longitudinal beam alone. In an embodiment, the second battery module includes the first battery sub-box 601, the second battery sub-box 602 and the battery frame 603. The first battery sub-box 601 is connected to the second battery sub-box 602 through the battery frame 603, the first battery sub-box and the second battery sub-box are respectively fixed below two ends of the first battery module, the battery frame is fixed on the bottom of the longitudinal beam, and the battery frame is provided with the quick-change connector or the electrical connector.

In an embodiment, the second battery module can be replaced by lifting at the bottom, i.e., the second battery module is disassembled under the vehicle by the lifting structure, and the hoisting battery replacement above the vehicle can be achieved simultaneously, which increases the speed of battery replacement. In addition, under a premise of a certain battery capacity, a solution of only installing the battery module on the top can be replaced by the solution of combining the top battery module and the lower battery module. In this way, a height of the first battery module 100 on the top can be reduced, to reduce a center of gravity of the battery and improve the stability of the battery, and the total battery module is divided into the upper battery module and the lower battery module, i.e., the first battery module 100 in the upper, and the second battery module in the lower, can be fixedly connected to the longitudinal beam, which further improves the stability of the battery.

In an embodiment, the battery frame 603 can be connected to the longitudinal beam or the fixing bracket for fixing the second battery module to the longitudinal beam through a locking device, and the locking device can include a first locking portion and a second locking portion. The first locking portion is provided on an outer side of the battery frame, the second locking portion is provided at the bottom of the longitudinal beam, and the battery frame is fixed at the bottom of the longitudinal beam in a way that the first locking portion is matched with the second locking portion for locking. In an embodiment, the first locking portion includes a plurality of first locking members, the plurality of first locking members are provided around the outer side of the battery frame. For example, four first locking members can be provided on two outer sides of the battery frame perpendicular to the longitudinal beam, and each side is provided with two first locking members. In an embodiment, an amount of the locking members can be increased according to actual requirements. The second locking portion includes a plurality of second locking members, which are correspondingly provided with the plurality of the first locking members. There are various arrangements for the locking device, some of which are described below with examples: in an embodiment, the locking device may also include a fastener, the first locking member includes a locking through hole, the second locking member includes a locking column matched with the locking through hole, and the locking column can pass through the locking through hole to connect the fastener. The fastener can be a fixing nut, and a top of the locking column is provided with a thread matched with a nut. In an embodiment, the locking device includes the fastener, the first locking member includes the first locking through hole, the second locking member includes the second locking through hole, and the fastener passes through the first locking through hole and the second locking through hole to get connected to the second locking through hole. An internal thread in provided inside the second locking through hole, and the fastener is a bolt with an outer thread. The locking device can lock and limit to prevent the battery box from shaking or moving.

Figure 12:
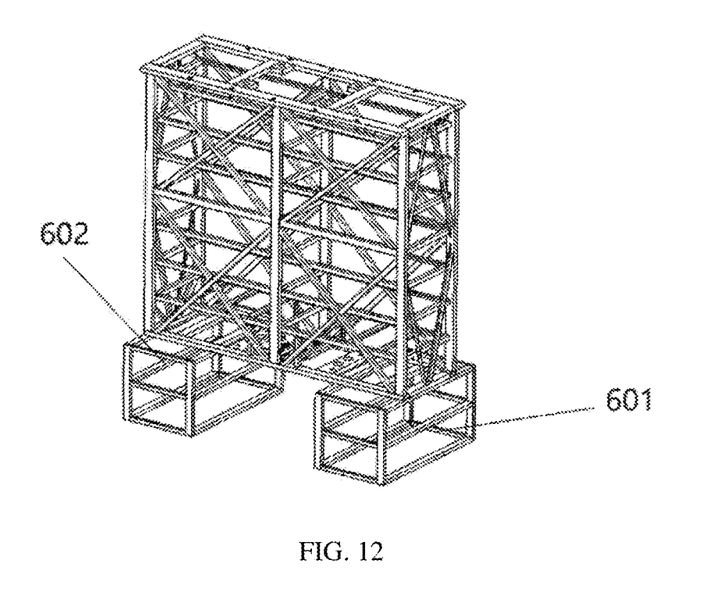
FIG. 12 is a schematic structural view of a second battery module according to an embodiment of the present application.

In an embodiment, as shown in FIG. 12, the second battery module includes the first battery sub-box 601 and the second battery sub-box 602, the first battery sub-box 601 and the second battery sub-box 602 are respectively fixed below the two ends of the first battery module 100. In an embodiment, the second battery module can be integrated with the first battery module 100, that is, the battery in the first battery module 100 and the battery in the second battery module are connected to form a complete battery module, and a complete frame is provided outside the battery module. In addition, the second battery module and the first battery module can also be separately provided, the two battery sub-boxes are respectively provided with a separate frame, and the two battery sub-boxes are respectively connected to the frame of the first battery module 100 through the separate frame, which facilitates disassembling and maintenance. In this way, the height of the first battery module 100 on the top can be reduced, to reduce the center of gravity of the battery and improve the stability of the battery. In addition, combined with the upper first floating structure, under a traction of the lower second battery module, the vibration amplitude of the first battery module 100 at the top can be further reduced.

Figure 13:
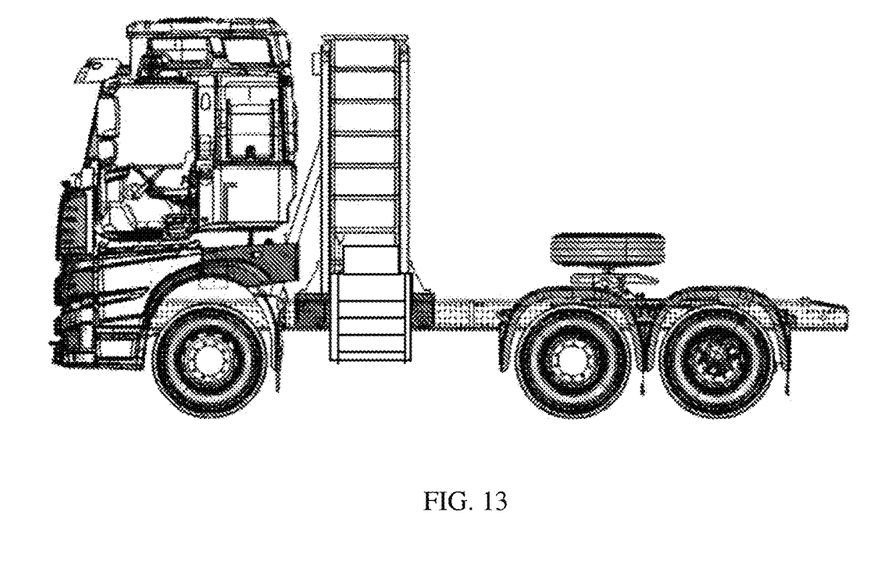
FIG. 13 is a schematic view of a location of a battery replacement device distributed on the vehicle according to an embodiment of the present application.

In an embodiment, the first battery module can be a cuboid structure, and the first battery module is provided on the top of the longitudinal beam. In an embodiment, the first battery module can also be in other shapes and provided on the top of the longitudinal beam. In an embodiment, as shown in FIG. 13, the cross section of the first battery module 100 can be an inverted concave font structure, a recess of the first battery module 100 is fixed on the top of the longitudinal beam, and the first battery module 100 is mounted on the longitudinal beam of the vehicle in a saddle shape, the longitudinal beam supports the recess of the battery box, and both sides of the first battery module 100 are connected to the side of the longitudinal beam. Compared with the arrangement of the cuboid structure on the top of the longitudinal beam, the center of gravity of the battery box can be effectively lowered and the stability of the battery box 1 can be increased. In an embodiment, the first battery module 100 with the inverted concave font structure includes two split-type inverted L-shaped battery sub-boxes that are mirror-symmetrical. In an embodiment, the battery in the first battery module 100 is an integrated inverted concave structure, the external battery frame is also an inverted concave structure, and the concave-shaped battery is an inverted concave structure. In an embodiment, the battery is an integrated inverted concave structure, and the battery frame includes two separate L-shaped frames. It should be noted that, regardless of whether the first battery module is the cuboid structure as shown in FIG. 1 or the inverted concave structure, the arrangement scheme of the second battery module can be adopted.

Figure 14:
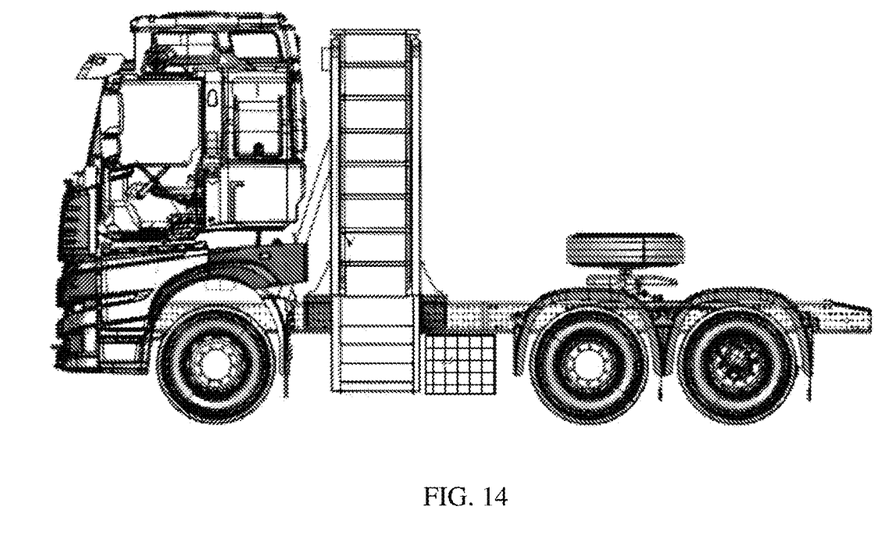
FIG. 14 is a schematic view of a location of a battery replacement device distributed on the vehicle according to an embodiment of the present application.

As shown in FIG. 14, on a basis that the cross-section of the first battery is the inverted concave structure, there is another arrangement of the second battery module. For example, the second battery module can be of vertically long shape, with a same width of the longitudinal beam, and is longitudinally fixed at the bottom of the longitudinal beam. In this way, a concave space of the concave battery module can be reasonably used, a layout space of the overall battery is reduced, the height of the upper battery module is reduced, and the battery stability is improved. In an embodiment, the second battery module is replaced by lifting at the bottom.

Figure 15:
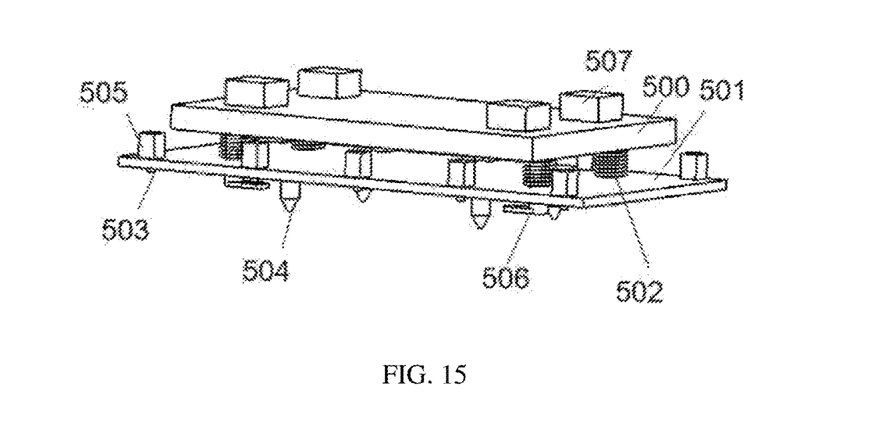
FIG. 15 is a schematic structural view of a dual-floating battery replacement station according to an embodiment of the present application.

The present application also provides a dual-floating hoisting battery replacement station, as shown in FIG. 15, which includes a battery grabbing structure. The battery grabbing structure includes a grabbing plate 500 and a second floating structure, the battery replacement station is provided with the floating structure cooperated with the floating structure on the vehicle when grabbing to form the dual-floating battery replacement device.

The second floating structure is fixed to a grabbing side of the grabbing plate 500, the grabbing plate 500 is cooperated with the first battery module 100 of the vehicle through the second floating structure to grab or release the first battery module 100. As shown in FIG. 7, the second floating structure is used to alleviate a swing amplitude of the battery grabbing structure when grabbing the battery module. In an embodiment, the second floating structure includes a second floating platform 501 and a third floating portion 502, and the second floating platform 501 is connected to the grabbing plate 500 through the third floating portion 502.

In an embodiment, the battery grabbing structure also includes a grabbing portion 506, the grabbing portion 506 runs through the second floating platform 501, and the grabbing portion 506 is used to cooperate with the first battery module 100 to grab or release.

In an embodiment, the third floating portion 502 is sleeved outside the grabbing portion 506. The third floating portion 502 can be a compression member or the elastic member, such as the spring. The second floating structure can also provide a prestressed force when the battery grabs to be locked.

In an embodiment, the dual-floating hoisting battery replacement station also includes a grabber rotation motor, and the grabber rotation motor is electrically connected to the grabbing portion 506.

In an embodiment, the second floating platform 501 is provided with the first locking portion 503, and the first locking portion 503 is used to cooperate with the first battery module 100 to lock or unlock.

In an embodiment, the second floating platform 501 is provided with a locking drive motor 505, the locking drive motor 505 can also transmit a rotation angle and a torque information during the battery replacement, and is used for judging a correctness of the locking.

The locking drive motor 505 is electrically connected to the first locking portion 503.

In an embodiment, the floating platform is provided with a sixth positioning portion 504, and the sixth positioning portion 504 is connected to the first battery module 100 to position.

In an embodiment, the dual-floating hoisting battery replacement station also includes a pressure sensor, and the pressure sensor is provided on the grabbing portion 506. The pressure sensor can be used to sense a pressure of the grabbing portion 506, to judge a grabbing situation.

Due to an uneven load quality, a deformation of the vehicle, and an uneven tire pressure during the battery replacement in the battery replacement station of the existing battery replacement system, it is difficult to locate the grabbing device in the battery replacement station, and it is easy to swing during the battery replacement, which causes safety risks. The battery replacement device in the battery replacement station provided in present application includes the floating grabbing platform with guiding positioning and fast locking/unlocking, which can be precisely position and quickly locked/unlocked. The second floating structure reduces a swing of the system caused by a deviation between the center of gravity of the power battery and a center of the grabbing device, alleviates the swing or the vibration amplitude, to improve the safety during the battery replacement.

The sixth positioning portion 504 is matched with the first battery module 100 to position, and the locking drive motor 505 drives the first locking portion 503 to lock or unlock the system. The second floating platform is guided and limited by the grabbing portion.

Figure 16:
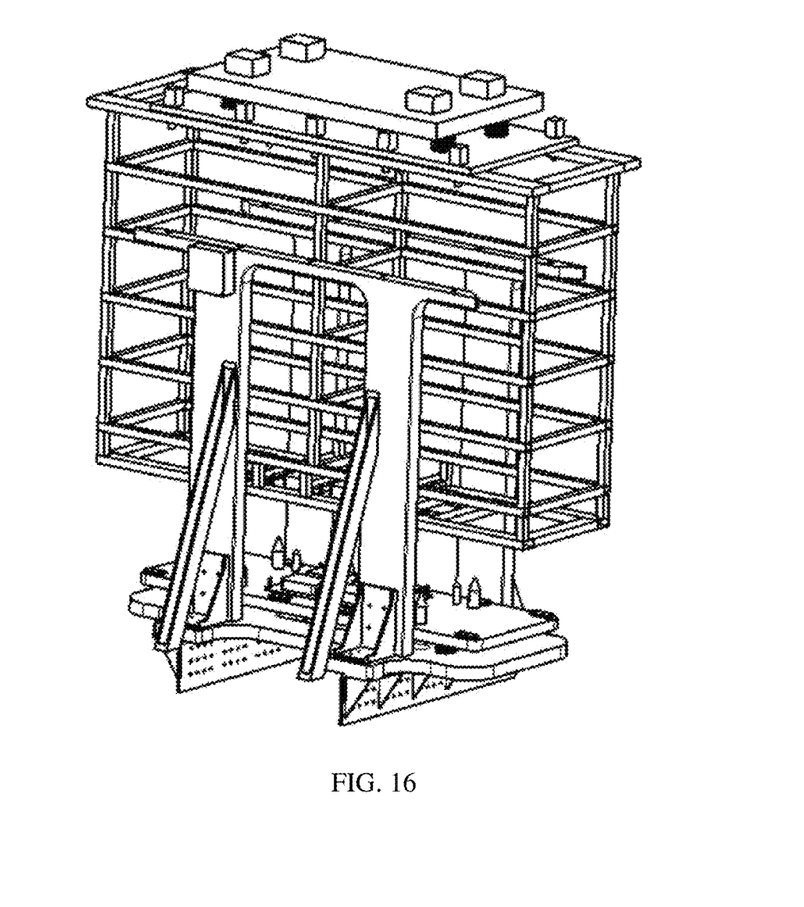
FIG. 16 is a schematic cooperative view of a battery replacement device for vehicles and a dual-floating battery replacement station according to an embodiment of the present application.

The grabbing portion 506 is cooperated with an upper pressing bracket to grab or release the first battery module 100. In an embodiment, the dual-floating hoisting battery replacement station also includes the grabber rotation motor 507, the grabber rotation motor 507 can drive the grabbing portion 506 to rotate, and the grabbing portion 506 is cooperated with the top bracket of the battery to grab or release the first battery module. FIG. 16 is a schematic cooperative view of the battery replacement device for vehicles and the dual-floating battery replacement station.

The present application also provides a dual-floating hoisting battery replacement system for vehicles, including the battery replacement device for vehicles and the dual-floating hoisting battery replacement station.

What is claimed is:

1. A battery replacement device for vehicles, comprising a first battery module, a first floating structure and a fixing device; wherein
   the fixing device is configured to fix the first battery module on a longitudinal beam of a vehicle;
   the fixing device comprises a fixing substrate configured to carry the first battery module;
   the first floating structure is provided between the first battery module and the fixing substrate, and configured to alleviate a vibration amplitude of the first battery module;
   the first floating structure comprises a first floating portion, a buffer limiting portion and a battery floating platform;
   a bottom surface of the battery floating platform is connected to the fixing substrate through the first floating portion, and a top surface of the battery floating platform is connected to the first battery module through the buffer limiting portion;
   the battery floating platform is provided with a first positioning portion and a second positioning portion;
   the fixing substrate is provided with a third positioning portion;

a bottom of the first battery module is provided with a fourth positioning portion and a fifth positioning portion; and the fifth positioning portion and the first positioning portion are connected to the third positioning portion, and the second positioning portion is matched with the fourth positioning portion.

2. The device of claim 1, wherein the first positioning portion and the fifth positioning portion are both first positioning pin holes, and the third positioning portion is a first positioning pin matching the first positioning pin hole; and the second positioning portion is a second positioning pin, and the fourth positioning portion is a second positioning pin matching a second positioning pin hole.

3. The device of claim 1, further comprising a connector; wherein the first floating structure further comprises a connector floating platform and a second floating portion;

the connector is fixed on the connector floating platform; and the connector floating platform is fixed on the battery floating platform through the second floating portion.

4. The device of claim 1, further comprising a buffer portion provided on the fixing substrate.

5. The device of claim 1, wherein the fixing device further comprises a first side bracket and a second side bracket opposite to each other;

the first side bracket and the second side bracket are connected to the fixing substrate, and the first side bracket is opposite to the second side bracket along a direction of a longitudinal beam.

6. The device of claim 5, further comprising a first support structure and a second support structure, wherein one end of the first support structure and one end of the second support structure are connected to the longitudinal beam, and another end of the first support structure is connected to the first side bracket and another end of the second support structure is connected to the second side bracket.

7. The device of claim 5, further comprising a top frame, wherein the top frame is provided on a top of the first battery module, and is locked to the first side bracket and the second side bracket; and the top frame is provided with a positioning structure and a locking structure, the positioning structure and the locking structure are configured to cooperate with a battery replacement device of a battery replacement station to grab or release.

8. The device of claim 1, further comprising a second battery module fixed to a bottom or a side wall of the longitudinal beam at any side of the vehicle, wherein the second battery module comprises a first battery sub-box, a second battery sub-box and a battery frame, the first battery sub-box is connected to the second battery sub-box through the battery frame, the battery frame is fixed at the bottom of the longitudinal beam, and the battery frame is provided with a quick-change connector or an electrical connector.

9. The device of claim 8, further comprising the second battery module, wherein the second battery module comprises the first battery sub-box, the second battery sub-box and the battery frame, the first battery sub-box and the second battery sub-box are respectively fixed below two ends of the first battery module, the battery frame is fixed at the bottom of the longitudinal beam, and the battery frame is provided with a quick-change connector or an electrical connector.

10. A dual-floating hoisting battery replacement station, comprising a battery grabbing structure, wherein the battery grabbing structure comprises a grabbing plate and a floating structure;

the floating structure is fixed on a grabbing side of the grabbing plate; and the grabbing plate is cooperated with a first battery module of a vehicle through the floating structure to grab or release the first battery module, and the floating structure is configured to alleviate a swing amplitude of the battery grabbing structure when grabbing the battery module;

the floating structure comprises a floating platform and a floating portion;

the floating platform is connected to the grabbing plate through the floating portion; and the battery grabbing structure further comprises a grabbing portion, the grabbing portion is passed through the floating platform, and the grabbing portion is configured to cooperate with the first battery module to grab or release; the floating portion is sleeved outside the grabbing portion.

11. The dual-floating hoisting battery replacement station of claim 10, wherein the floating platform is provided with a first locking portion, and the first locking portion is configured to be matched with the first battery module to lock or unlock.

12. The dual-floating hoisting battery replacement station of claim 11, wherein the floating platform is provided with a locking drive motor; and the locking drive motor is electrically connected to the first locking portion.

13. The dual-floating hoisting battery replacement station of claim 10, wherein the floating platform is provided with a positioning portion; and the positioning portion is cooperated with the first battery module to position.

14. A vehicle hoisting battery replacement system, comprising: the battery replacement device for vehicles according to claim 1 and a dual-floating hoisting battery replacement station comprising a battery grabbing structure, wherein the battery grabbing structure comprises a grabbing plate and a floating structure;

the floating structure is fixed on a grabbing side of the grabbing plate; and the grabbing plate is cooperated with the first battery module of the vehicle through the floating structure to grab or release the first battery module, and the floating structure is configured to alleviate a swing amplitude of the battery grabbing structure when grabbing the battery module;

the floating structure comprises a floating platform and a floating portion;

the floating platform is connected to the grabbing plate through the floating portion; and the battery grabbing structure further comprises a grabbing portion, the grabbing portion is passed through the floating platform, and the grabbing portion is configured to cooperate with the first battery module to grab or release; the floating portion is sleeved outside the grabbing portion.

* * * * *